(No Model.)
W. YOUNG.
DEVICE FOR STRETCHING WIRE.
No. 304,888. Patented Sept. 9, 1884.
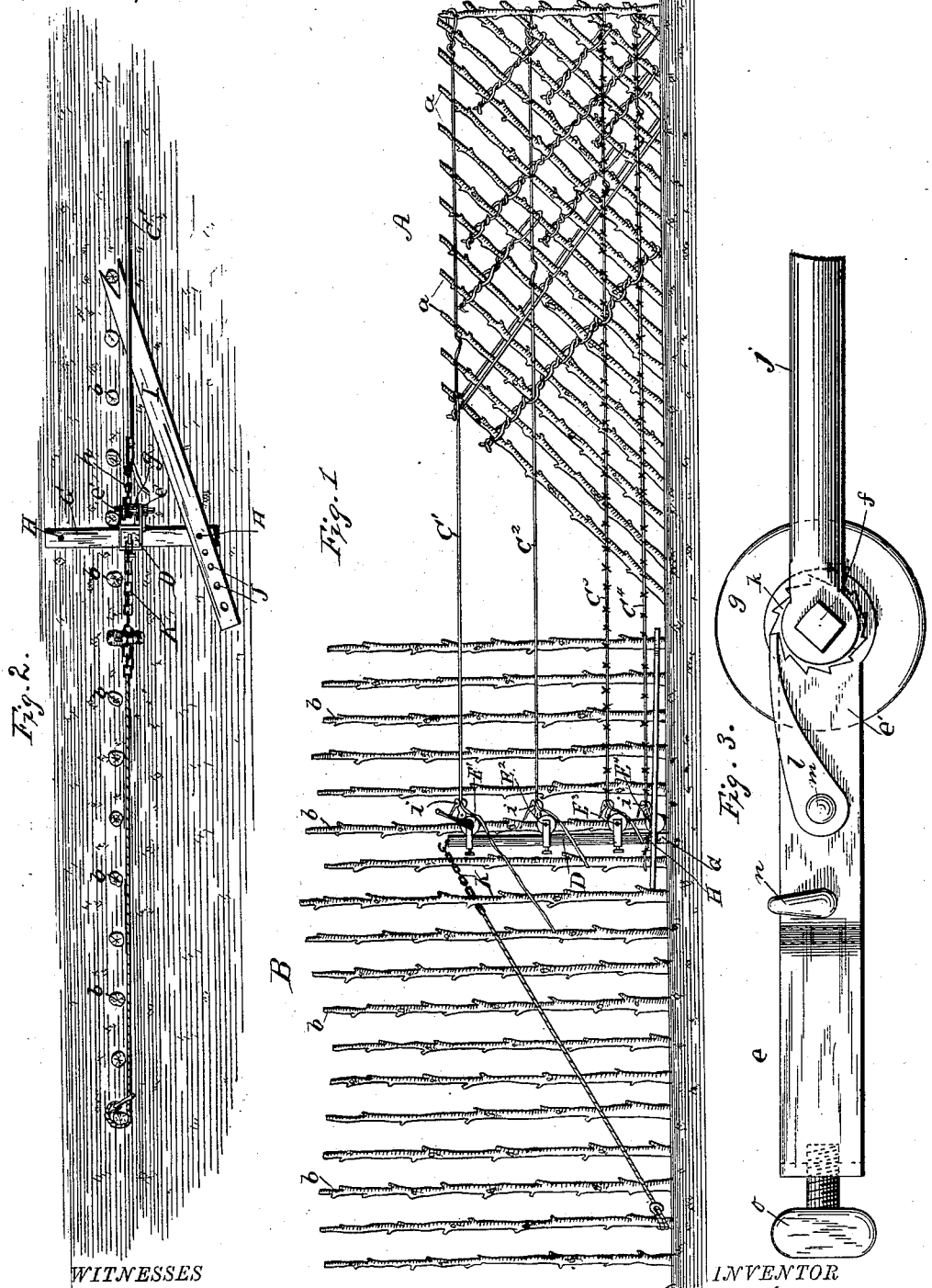

UNITED STATES PATENT OFFICE.

WESLEY YOUNG, OF DAYTON, OHIO.

DEVICE FOR STRETCHING WIRE.

SPECIFICATION forming part of Letters Patent No. 304,888, dated September 9, 1884.

Application filed February 23, 1884. (No model.)

*To all whom it may concern:*

Be it known that I, WESLEY YOUNG, of the city of Dayton, in the county of Montgomery and State of Ohio, have invented certain new and useful Improvements in Devices for Stretching Wire; and I do hereby declare the following to be a full, clear, and exact description of the same, reference being had to the accompanying drawings, forming a part of this specification, and to the figures and letters of reference marked thereon.

My invention has for its object to provide a cheap, simple, and portable device for stretching wire, and particularly for stretching the horizontal wires used in making plashed hedge wire fences.

I will first describe my invention with reference to the accompanying drawings, and will then point out particularly its special features of novelty in the claims at the end of this specification.

Figure 1 of said drawings represents a side elevation of a hedge wire fence in process of construction, showing the application of my improvements thereto. Fig. 2 is a top plan view of the same. Fig. 3 is an enlarged view of one of the stretchers detached.

Similar letters of reference in the several figures indicate the same parts.

The letter A indicates a plashed section of a hedge wire fence, the plants $a$ comprising it being bent down and secured in a manner detailed at length in another application for a patent filed by me contemporaneously herewith.

B represents a line of plants standing in upright position and ready to be bent down and secured so as to form a continuation of the section A.

$C'\ C^2\ C^3\ C^4$ represent the horizontal wires which enter into the construction of the fence, and which wires it is the design of my invention to stretch and keep taut while being stapled or otherwise secured to the bent-down plants.

D represents an upright, made preferably of wood, and of polygonal shape in cross-section, as shown in Fig. 2. Upon the upright are arranged so as to be capable of vertical adjustment thereon a series of stretchers, $E'\ E^2\ E^3\ E^4$. Each of these stretchers consists of a frame formed with an opening, $e$, for the passage of the upright D, preferably of a shape corresponding to the shape of said upright, to such an extent, at least, as to prevent any turning of the frame upon its horizontal axis, but permit of a free vertical movement thereon. It further consists of two arms, $e'\ e'$, which form the bearings of a shaft, $f$, which extends both ways beyond the arms, and bears between the arms $e'\ e'$, a drum, $g$, to which is attached a chain, $h$, carrying at its outer end a clamp, $i$, of any desired construction. The ends of the shaft $f$ outside of the arms $e'\ e'$ are squared off to receive the socket of a removable handle or crank, $j$, and one of them has mounted upon and secured to it a ratchet-wheel, $k$, with which a pivoted pawl, $l$, hung upon the frame at $m$, is adapted to engage. A projection, $n$, is formed on the frame for the purpose of catching the pawl when thrown back, and a set-screw, $o$, works through the back portion of the frame into the opening $e$, and is adapted to impinge upon the upright D and secure the stretcher at any desired point of adjustment. When in use, the upright is stood up and secured alongside of one of the standing plants, $b$, and the various horizontal lines of wire $c'\ c^2\ c^3\ c^4$ are caught by the clamps of the stretchers $E'\ E^2\ E^3\ E^4$, respectively, the latter being properly positioned and secured upon the upright. Then one after another, or all together, the drums and all the stretchers are wound up by means of a crank or cranks until the requisite degree of tension is obtained upon the wires, when, with the wires still held under tension by the ratchets and pawls, the operators bend down, the upright plants one after another and secure them by staples to the stretched wires. After a sufficient number of the plants in front of the stretching device have been bent down, the device is moved farther along and again secured and operated as before.

Various means may be employed to hold the upright D in position; but I have found it most convenient to employ those shown in the drawings, consisting of a base-piece, G, carrying a pin, H, near each end, and to the middle of which the upright D is secured, as shown in Fig. 2, a brace, I, having a series of adjusting-holes, J, at its rear end adapted to receive either of the pins H, and having a forked front end adapted to engage with one of the plants in advance of the stretchers, and a chain, K, adapted to be connected to the upper part of the upright D, by a hook or otherwise, and to pass down behind one or more of the rear plants, as shown in Fig. 2, and be secured to the base of one of the rear plants, as seen in Figs. 1 and 2. The cross-bar is made to extend to each side of the line of plants for the purpose of giving a wider bearing for the apparatus, and also to enable the stretchers and brace I to be applied at either side of the fence, as desired. The brace I operates to prevent the upright D from turning on its vertical axis, while the chain K serves to resist the tendency of the upright to move forward and to bend down the plant against which it rests, as well as to prevent any tendency of the apparatus to tip over sidewise.

The whole equipment weighs but little and can be carried from place to place and operated by a single person.

While I have shown the device as applied to the stretching of wires for hedge wire fences, it is obvious that it may be employed to stretch wires for ordinary post and wire fences, or for other purposes.

I claim as my invention—

1. The combination, with the upright and the stretchers mounted thereon, of the cross-piece adapted to be inserted between the plants, and the diagonal brace extending from the cross-piece to a plant or post in advance of the stretcher, substantially as described.

2. The combination, with the upright and the stretchers mounted thereon, of the bottom cross-piece adapted to extend on both sides of the plants, and the adjustable brace capable of adjustment to either end of the cross-piece, substantially as described.

3. The combination, with the upright and its stretchers, of the cross-piece adapted to be inserted between the plants and bear against one of them, and the rearwardly-extending chain or rope, substantially as described.

4. The combination, with the upright and its stretchers, of the cross-piece, the diagonal brace extending to a plant or post, and the rearwardly-extending chain or rope, substantially as described.

5. The combination, with the upright and its stretchers, of the cross-piece extending on both sides of the plants, the diagonal brace applicable to either end of the cross-piece, and the rearwardly-extending rope or chain, substantially as described.

WESLEY YOUNG.

Witnesses:
   CHAS. W. WETZEL,
   WM. S. BROWN.